United States Patent Office 2,767,021
Patented Oct. 16, 1956

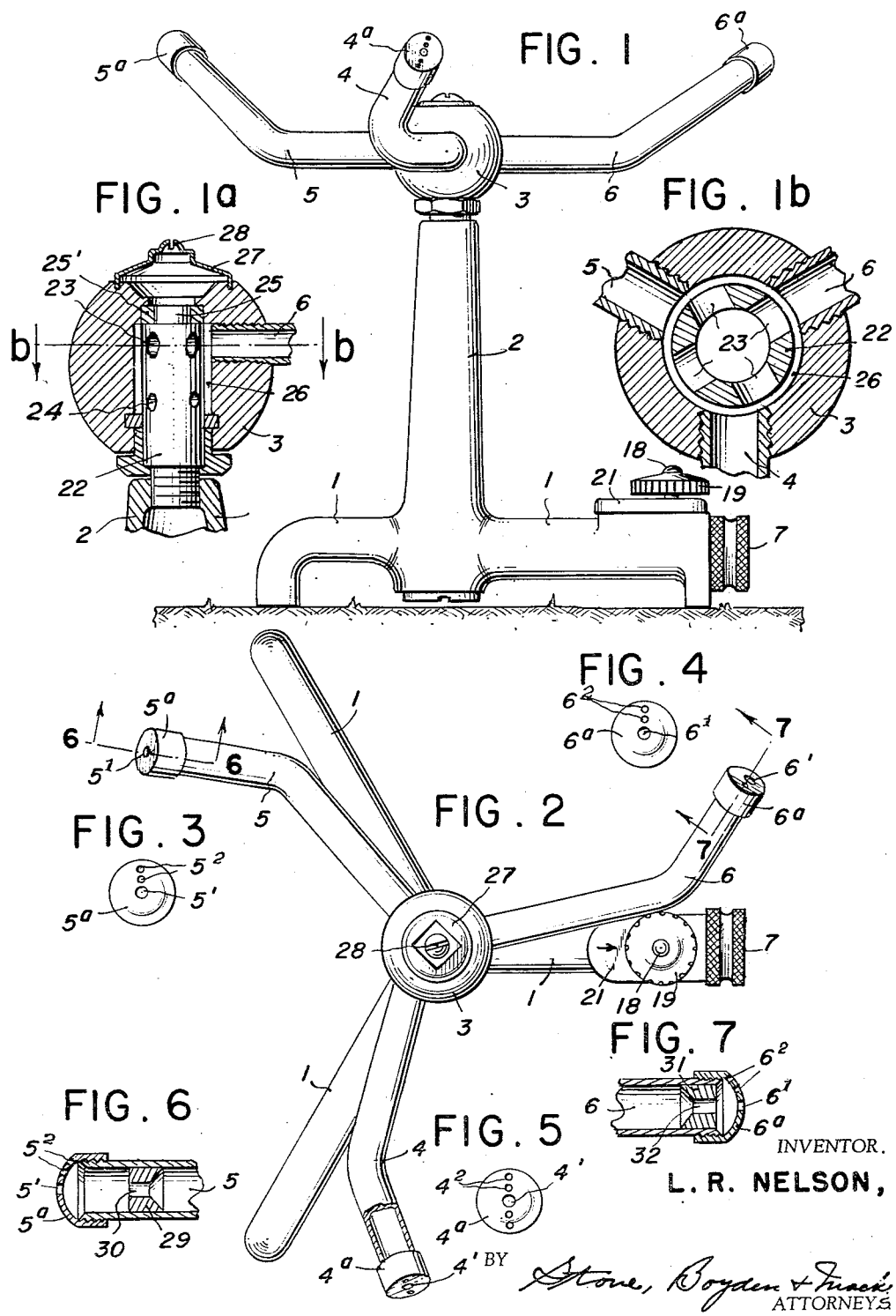

2,767,021

LAWN SPRINKLERS

Lewen R. Nelson, Peoria, Ill.

Original application December 6, 1950, Serial No. 199,514, now Patent No. 2,723,159, dated November 8, 1955. Divided and this application November 25, 1953, Serial No. 394,420

5 Claims. (Cl. 299—69)

This invention relates to rotary lawn sprinklers, the present application being a division of my application Serial Number 199,514, filed December 6, 1950, now Patent No. 2,723,159, dated November 8, 1955.

In particular, the invention is concerned with provision of a lawn sprinkler of the whirling arm type in which means is provided to assure uniform coverage of the ground area to be sprinkled.

In the past, efforts have been made to obtain a uniform watering of the sprinkled area by providing adjustable nozzles on the arms in order that the discharge from each arm might be concentrated over a given portion of the total ground area. Such constructions have been relatively complicated and expensive, and ordinarily require the operator to make a rather fine adjustment on each nozzle.

My invention provides simple and inexpensive means associated with one or more of the sprinkler arms and functioning to automatically control the discharge of water from the arms so as to assure an even coverage of the ground area without requiring any attention or adjustment by the operator.

In order that the invention may be understood in detail, reference is had to the accompanying drawings which form a part of this specification and wherein:

Fig. 1 is an elevational view of a sprinkler constructed in accordance with one embodiment of my invention;

Fig. 1$^a$ is a vertical section taken through the sprinkler head of the device of Fig. 1;

Fig. 1$^b$ is a transverse sectional view through the sprinkler head of the device of Fig. 1;

Fig. 2 is a plan view of the sprinkler shown in Fig. 1;

Figs. 3–5 are face views of the sprinkler arm nozzles of the device of Fig. 1;

Fig. 6 is a fragmentary sectional view taken on the line 6—6, Fig. 2; and

Fig. 7 is a fragmentary sectional view taken on the line 7—7, Fig. 2.

As seen in Figs. 1 and 2, the embodiment of the invention there illustrated comprises a base portion, including the legs 1, from which arises a standard 2 supporting a rotary sprinkler head 3. The sprinkler head carries a plurality of radially disposed sprinkler arms 4, 5 and 6, water being supplied to these arms via the standard 2 and one of the legs 1, the latter being provided with any suitable coupling 7 for connection to a garden hose (not shown).

The leg 1 carrying the coupling 7 may be provided with a suitable manually adjustable valve, as described in detail in my aforesaid application Serial Number 199,514. Such valve, affording a means for controlling the total flow of water to the sprinkler arms 4—6, serves to provide for manual selection of the total extent of the ground area to be sprinkled. Accordingly, the valve may include an operating shaft 18 carrying a calibrated dial 19.

In Fig. 1$^a$ it will be observed that the standard 2 supports what may be termed a sprinkler head member 3 which encloses a tubular member 22 suitably secured within the bore of said standard, it being noted, in the present instance, that said member 22 has four openings or ports 23 in its wall near the upper extremity thereof, all lying in the same plane and equally spaced from each other. Also, that spaced below said ports 23 the member has a number of openings or ports 24 but each of less diameter than any one of the said ports 23. Preferably the upper extremity of the member 22 is reduced in diameter as at 25 encircling which is a bushing 25'. As seen in Fig. 1$^a$, the member 3 carrying the arms 4, 5 and 6 encloses the member 22 together with the bushing 25', while resting upon the latter. Said member 3 has a bore greater in diameter than the member 22, as shown, as thereby a space 26 is created in such position and of such an extent that all of the openings or ports 23, 24 may communicate therewith. At its lower extremity the member 3 receives the well known packing-nut arrangement for preventing leakage of water from the space 26. Surmounting the member 3 is a shell portion 27 having a narrow slit 28 therein for the issue therethrough of a fan-shaped water jet.

The sprinkler arms 4, 5 and 6 all communicate, as to their bores, with the annular space 26 and the bore-axes may coincide with the axes of the openings or ports 23 of the member 22, the diameters of the bores and the ports 23 being, by choice, substantially equal in measurement.

The extremities of the sprinkler arms 4, 5, 6, are each provided with a nozzle 4$^a$, 5$^a$, and 6$^a$, respectively, it being noted in Fig. 5 that the nozzle 4$^a$ has a central discharge opening 4' and two smaller openings 4$^2$ at each side of said opening 4' all the holes lying in line, in this instance. Also it is noted in Fig. 3 that the nozzle 5$^a$ has a central opening 5' and two smaller openings 5$^2$, while in Fig. 4 the nozzle 6$^a$ has a central opening 6' and two smaller openings 6$^2$. In each of the three nozzles, in this particular instance, as shown in the drawings, the lines of holes lie perpendicular to the plane of rotation of the arms.

In Figs. 6 and 7 is shown an extremity of two of the sprinkler arms and their nozzles. A perforated plug is shown in the bore of each arm. That is to say, in the first of the two figures named a plug 29 snugly fits in the bore of the arm 5 and has a flow restricting orifice or bore 30 in alignment with the central hole 5', said plug being spaced some considerable distance from the nozzle 5$^a$. In Fig. 7 the arm 6 is furnished with a plug 31 which has a flow restricting orifice or bore 32 in alignment with the nozzle opening 6', but as contrasted to the position of the plug 29 of the arm 5 this plug is located in quite close proximity to the nozzle 6$^a$.

In operation, the delivery of water is partly through the central openings or holes 4', 5', 6' of the nozzles and partly through the openings 4$^2$, 5$^2$, and 6$^2$ thereof for a thorough coverage by water of a given area distant from the sprinkler, assisted by the nozzle opening 28 at the top of the same for the area nearest said sprinkler. Without some type of controlling means the sprinkler arms would cast their water streams to describe a circular area. In order that areas having straight lines only, as their boundaries, may be sprinkled, the herein described head arrangement is employed. In Fig. 1$^b$ it is observed that while there are three arms and thus but three outlets for water discharge, the member 22, has four openings or ports. This being true, it is clear that as in the figure named a full flow of water from the member 22 through an opening 23 may pass directly across the space 26 into the arm 6. At this position of the two members 3 and 22 the other openings 23 open more or less, only, toward the other arms 4 and 5 and discharge water partly thereinto and partly into the annular space 26. When an arm is in register with an opening 23 the issuing water-stream will reach to and define a corner of a square area being sprinkled since a full and free flow of water is permitted. In controlling the water flow between any two corners of a square area, it is necessary to gradually reduce the flow to a lowest point so that at the middle distance between any two corners of a square area the pressure will be least, this being followed by permitting a gradually increasing pressure as a sprinkler-arm approaches a position where the water stream again defines a corner of the sprinkled area. For this reason a spacing apart of the member 22 and the member 3 is resorted to together with the proper spacing of the openings 23 and their relation in number to the number of sprinkled arms, so that, as will be clear in viewing Fig. 1ᵇ, each arm in its swing will gradually receive water flow, which flow will then increase to a full flow followed by a decreasing flow in accordance with the required defining of area boundaries. Naturally, since the bores of the arms are first exposed to the openings 23 for a full flow of water and then exposed to the blind portions of the wall of the member 22, between its said openings, a rise and fall of pressure or flow will result. For this reason the openings or ports 24 of the said member 22 are provided in order that the pressure of water from the standard 2 may equalize to the proper degree the movement of water throughout.

Since the end portions of the sprinkler arms 4—6 are all offset in the same direction, discharge of water from the nozzles 4ᵃ—6ᵃ causes the sprinkler head to rotate. It will be noted that, while the main discharge is via apertures 4'—5', there is an auxiliary discharge from the smaller apertures 4²—6², the discharges from these latter apertures each being at an angle to the main discharges. Thus, by rotary adjustment of the nozzles 5ᵃ and 6ᵃ, the speed of rotation of the sprinkler head may be varied, since rotary adjustment of those nozzles will increase or decrease the effective angle of discharge therefrom.

In operation the rate of flow of water to the sprinkler head, and thus to all of the sprinkler arms, is adjusted by means of the valve controlling dial 19, such adjustment determining the total ground area to be sprinkled. Then, by rotary adjustment of the nozzles 5ᵃ and 6ᵃ, the speed of rotation of the sprinkler may be determined.

While manipulation of the valve dial 19 and the nozzles 5ᵃ and 6ᵃ will determine the area to be sprinkled and the total rate of sprinkling, uniform coverage of the area being sprinkled is effected automatically by the controlling operations of the flow restricting plugs 29 and 31. It will be noted that the plug 31 is positioned relatively close to the nozzle 6ᵃ, the space between the plug and the discharge aperture 6' of the nozzle being such that water flows from the plug and through the nozzle as a substantially full or unbroken stream with sufficient velocity to reach the extreme edge portion of the area to be sprinkled. On the other hand, the plug 29 is spaced at a relatively greater distance from its nozzle 5ᵃ so that the stream of water passed by the plug 29 may become broken or relatively diffused before reaching the discharge apertures of the nozzle. Accordingly, the discharge from nozzle 5ᵃ is in the form of a relatively fine spray concentrated within an area smaller than the total ground area being sprinkled. The sprinkler arm 4 is not provided with a flow restricting plug, so that the nature of the spray discharged by the nozzle 4ᵃ depends solely upon the disposition of the discharge apertures in that nozzle. It is thus seen that, because of the function of the plugs 29 and 31, the main portion of the discharges from the three sprinkler arms may be concentrated over three different annular areas of the total ground area being sprinkled, and a thorough watering of the total area will thus be obtained.

It is desirable that the flow restricting orifices or bores 30 and 32 of the plugs 29 and 31, respectively, be axially aligned with the main discharge openings of the nozzles 5ᵃ and 6ᵃ, respectively. I, therefore, locate the plugs within the offset portions of the sprinkler arms.

While I have shown a preferred embodiment of the invention employing three sprinkler arms and including flow restricting plugs in two of the three arms, it will be clear that the invention may be embodied in a sprinkler having only two arms or in a sprinkler having more than three arms.

I claim:

1. In a rotary lawn sprinkler, the combination of a sprinkler head, means rotatably supporting said sprinkler head and constructed to supply water under pressure thereto, a plurality of radially disposed tubular sprinkler arms of substantially equal length carried by said head and arranged to receive water therefrom, each of said arms including at its outer end a portion providing a substantially straight, uninterrupted bore of uniform cross-section extending from said end inwardly toward said head for a material proportion of the total length of the sprinkler arm, each of said sprinkler arms being provided at its end with an apertured discharge nozzle, and means for causing the water discharged from one of said arms to issue as a relatively less concentrated stream directed primarily to a ground area smaller in extent than the total area watered by the sprinkler, said means comprising a plug member disposed in the substantially straight, uninterrupted bore of said one arm and provided with a longitudinally directed flow restricting orifice disposed substantially coaxially with respect to said bore, said plug member being constructed and arranged to substantially completely close said bore to water flow except via said orifice and being spaced from the corresponding discharge nozzle by a distance such that the water stream eminating from said orifice can diffuse in the portion of the substantially straight, uninterrupted bore of said one arm located between said plug member and the corresponding discharge nozzle.

2. In a rotary lawn sprinkler, the combination of a sprinkler head, means rotatably supporting said head and constructed to supply water under pressure thereto, a plurality of radially disposed tubular sprinkler arms carried by said head and arranged to receive water therefrom, each of said arms at its outer end terminating in an apertured discharge nozzle, and two plug members each fixed within the bore of a different one of said arms, each of said plug members being provided with a longitudinally directed flow restricting orifice disposed substantially coaxially of the corresponding sprinkler arm, said plug members being constructed and arranged to substantially completely close the bore of the arm in which the plug member is disposed to water flow except via the orifice of said plug, the spacings of said plugs from the outer ends of their respective arms being unequal so that said plugs coact with the nozzles of their respective arms to cause the water discharged from said arms to be distributed over different ground areas.

3. In a rotary lawn sprinkler, the combination of a sprinkler head, means rotatably supporting said head and constructed to supply water under pressure thereto, a plurality of radially disposed tubular sprinkler arms carried by said head and arranged to receive water therefrom, each of said arms including at its outer end a portion providing a substantially straight uninterrupted bore extending for a material proportion of the total length of the sprinkler arm, the outer tips of said arms each being provided with an apertured discharge nozzle, and two plug members each mounted in a different one of said bores, said plug members each being provided with a longitudinally directed flow restricting orifice substantially coaxial with respect to the bore in which the plug member is mounted, said plug members being constructed and arranged to substantially completely close said bores to water flow except via said orifices, one of said plug members being positioned relatively close to the nozzle of the arm in which said one plug member is mounted and having its flow restricting orifice substantially aligned with the aperture of the nozzle whereby water flowing from said one plug member passes through the nozzle as a substantially unbroken stream directed primarily to the outer portion of the ground area to be sprinkled, the other of said plug members being spaced from the nozzle of the arm in which said other plug member is mounted by a greater distance such that water flowing from said other plug member can diffuse into a less concentrated stream before reaching the nozzle and is therefore discharged from the nozzle as a less concentrated stream directed primarily to a ground area smaller in extent than the total area to be sprinkled.

4. In a reaction type rotary lawn sprinkler, the combination of a sprinkler head, means rotatably mounting said sprinkler head and constructed to supply water under pressure thereto, a plurality of radially disposed tubular sprinkler arms carried by said head and arranged to receive water therefrom, each of said arms including an offset end portion providing a substantially straight uninterrupted bore, a plurality of apertured discharge nozzles each mounted on the tip of one of said offset end portions, said end portions being offset in the same direction so that discharges from said nozzles produce aiding forces of reaction tending to rotate said head, and a plurality of plug members disposed each in a different one of said offset end portions and each provided with a longitudinally directed flow restricting orifice disposed substantially coaxially with respect to the bore in which the plug member is disposed, said plug members being constructed and arranged to substantially completely close the bores in which they are disposed to water flow except through said orifices, said plug members being each disposed at a different distance from the respective nozzles.

5. In a rotary lawn sprinkler, the combination of a sprinkler head, means rotatably supporting said head and constructed to supply water under pressure thereto, a plurality of radially disposed tubular sprinkler arms carried by said head and arranged to receive water therefrom, each of said arms including an end portion providing a substantially straight and uninterrupted bore extending from the arm tip for a substantial proportion of the total length of the arm, a plurality of cup-shaped nozzles of sheet-material each embracing the tip of a different one of said arms and each provided with a discharge aperture opening to the interior of the corresponding arm, and a pair of plug members each disposed in a different one of said bores and provided with a longitudinally directed flow restricting orifice defined entirely by the plug member, said plug members being constructed and arranged to substantially completely close their respective arms to water flow except via said orifices, one of said plug members being positioned in close proximity to the corresponding nozzle whereby said one plug member directs a concentrated stream of water through nozzle to the outer portion of the ground area to be sprinkled, the other of said plug members being spaced inwardly from its corresponding nozzle at a greater distance whereby the water stream emanating from said other plug member is allowed to diffuse before reaching the nozzle and is therefore discharged as a less concentrated stream directed primarily to a ground area smaller in extent than the total area to be sprinkled.

References Cited in the file of this patent

UNITED STATES PATENTS

| 1,656,417 | Browning | Jan. 17, 1928 |
| 1,950,712 | Coles | Mar. 13, 1934 |
| 2,110,112 | Rippey | Mar. 1, 1938 |
| 2,539,793 | Pangborn | Jan. 30, 1951 |
| 2,586,517 | Coles | Feb. 19, 1952 |

FOREIGN PATENTS

| 190,351 | Switzerland | July 1, 1937 |
| 212,794 | Great Britain | Mar. 20, 1924 |
| 433,249 | Germany | Aug. 25, 1926 |
| 694,738 | France | Sept. 22, 1930 |